(12) United States Patent
Lu

(10) Patent No.: US 11,170,115 B2
(45) Date of Patent: Nov. 9, 2021

(54) METHOD AND APPARATUS FOR SECURE EXTERNAL ACCESS OF THE PUF INFORMATION TO AN AUTHORIZED ENTITY

(71) Applicant: Taiwan Semiconductor Manufacturing Co., Ltd., Hsin-Chu (TW)

(72) Inventor: Shih-Lien Linus Lu, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 351 days.

(21) Appl. No.: 16/049,475

(22) Filed: Jul. 30, 2018

(65) Prior Publication Data

US 2020/0034549 A1    Jan. 30, 2020

(51) Int. Cl.
*G06F 21/60* (2013.01)
*H04L 9/30* (2006.01)
*H04L 9/32* (2006.01)

(52) U.S. Cl.
CPC .............. *G06F 21/602* (2013.01); *H04L 9/30* (2013.01); *H04L 9/3278* (2013.01); *H04L 2209/12* (2013.01)

(58) Field of Classification Search
USPC .......................................................... 713/189
See application file for complete search history.

(56) References Cited

U.S. PATENT DOCUMENTS

| | | | | |
|---|---|---|---|---|
| 5,018,196 | A * | 5/1991 | Takaragi | G06Q 20/00 380/30 |
| 8,868,923 | B1 * | 10/2014 | Hamlet | H04N 1/442 713/186 |
| 9,613,714 | B1 * | 4/2017 | Wong | G11C 7/24 |
| 2010/0241860 | A1 * | 9/2010 | Hanaoka | H04L 9/0891 713/170 |
| 2015/0207629 | A1 * | 7/2015 | Oshida | H03M 13/63 380/28 |
| 2016/0359636 | A1 * | 12/2016 | Kreft | G06F 21/73 |
| 2019/0238519 | A1 * | 8/2019 | Bikumala | H04L 9/16 |
| 2019/0305970 | A1 * | 10/2019 | Satpathy | H04L 9/3278 |

* cited by examiner

*Primary Examiner* — Harunur Rashid
*Assistant Examiner* — Sakinah White Taylor
(74) *Attorney, Agent, or Firm* — Duane Morris LLP

(57) ABSTRACT

Disclosed is a device and method to secure PUF information for authorized entities. In one embodiment, a device for securing physically unclonable function (PUF) information includes: a PUF information generator, comprising a PUF cell array and a helper data generator, configured to generate the PUF information, wherein the PUF information comprises a PUF response and helper data; and a PUF information encrypter, comprising a memory unit and a first cryptosystem, configured to store at least one public key and encrypt the PUF information from the PUF information generator using one of the at least one public key.

17 Claims, 4 Drawing Sheets

METHOD AND APPARATUS FOR SECURE EXTERNAL ACCESS OF THE PUF INFORMATION TO AN AUTHORIZED ENTITY

BACKGROUND

With the increasing use of integrated circuits in electronic devices that provide different types of information for a variety of different applications, there has been an increasing need to protect sensitive and/or critical information that may be stored within an electronic device to limit access to such information to only other devices that have permission to access the information. Some examples of such applications include the authentication of devices, protection of confidential information within a device, and securing a communication between two or more devices. A high quality random number generator to generate true random numbers is desirable for the aforementioned applications. For example, true random numbers may be used as an encryption key for encrypting information and messages.

A physically unclonable function (PUF) generator is a physical structure generally within an integrated circuit that provides a number of corresponding outputs (e.g., PUF responses) in response to inputs (e.g., challenges/requests) to the PUF generator. A unique identity of the integrated circuit may be established by such PUF responses provided by the PUF generator. With the establishment of the identity, secure communication can be guaranteed.

Initially, a device must synchronize its PUF response and corresponding helper data for processing a noisy PUF response with a communication partner (e.g., a server) through a channel, which can be used in a later secured communication. During this synchronization step, an unauthorized server may be able to obtain the PUF information from the devices by impersonating an authorized server through the channel. Therefore, it is necessary to secure the channel for synchronizing PUF information between devices and a server in order to prevent unauthorized servers to obtain the PUF information. Despite this long felt need, no suitable devices or methods meeting these requirements are available.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of illustration.

DETAILED DESCRIPTION OF EXEMPLARY EMBODIMENTS

The following disclosure describes various exemplary embodiments for implementing different features of the subject matter. Specific examples of components and arrangements are described below to simplify the present disclosure. These are, of course, merely examples and are not intended to be limiting. For example, it will be understood that when an element is referred to as being "connected to" or "coupled to" another element, it may be directly connected to or coupled to the other element, or one or more intervening elements may be present.

A physically unclonable function (PUF) generator is generally used for authentication and secret key storage without requiring secure electrically erasable programmable read-only memory (EEPROMs) and/or other expensive hardware (e.g., battery-backed static random-access memory). Instead of storing a key in a digital memory, a PUF generator derives a key based on its unique physical characteristics caused by inherent process variations to differentiate itself from others that are produced even from a same fabrication process. Generally, such key is referred to as a "PUF response." Variations in a number of parameters can be used to define such a signature such as, for example, gate delay, threshold voltage, power-on state of a SRAM-based device, and/or any of a variety of physical characteristics of an IC. Furthermore, a charge decay (e.g., discharge process) can be also used as a PUF response, which is typically used in DRAM-based PUF generators. In the present disclosure, a circuit and method to secure the PUF response to authorized servers is presented. In some embodiments, the PUF response is encrypted with a public key using an asymmetric encrypter and further decrypted by another asymmetric encrypter on a server based on a private key. The authorized server with a correct private key is able to decrypt the public key-encrypted PUF response received from the device, which can then be further used in a later secured communication.

Figure 1:
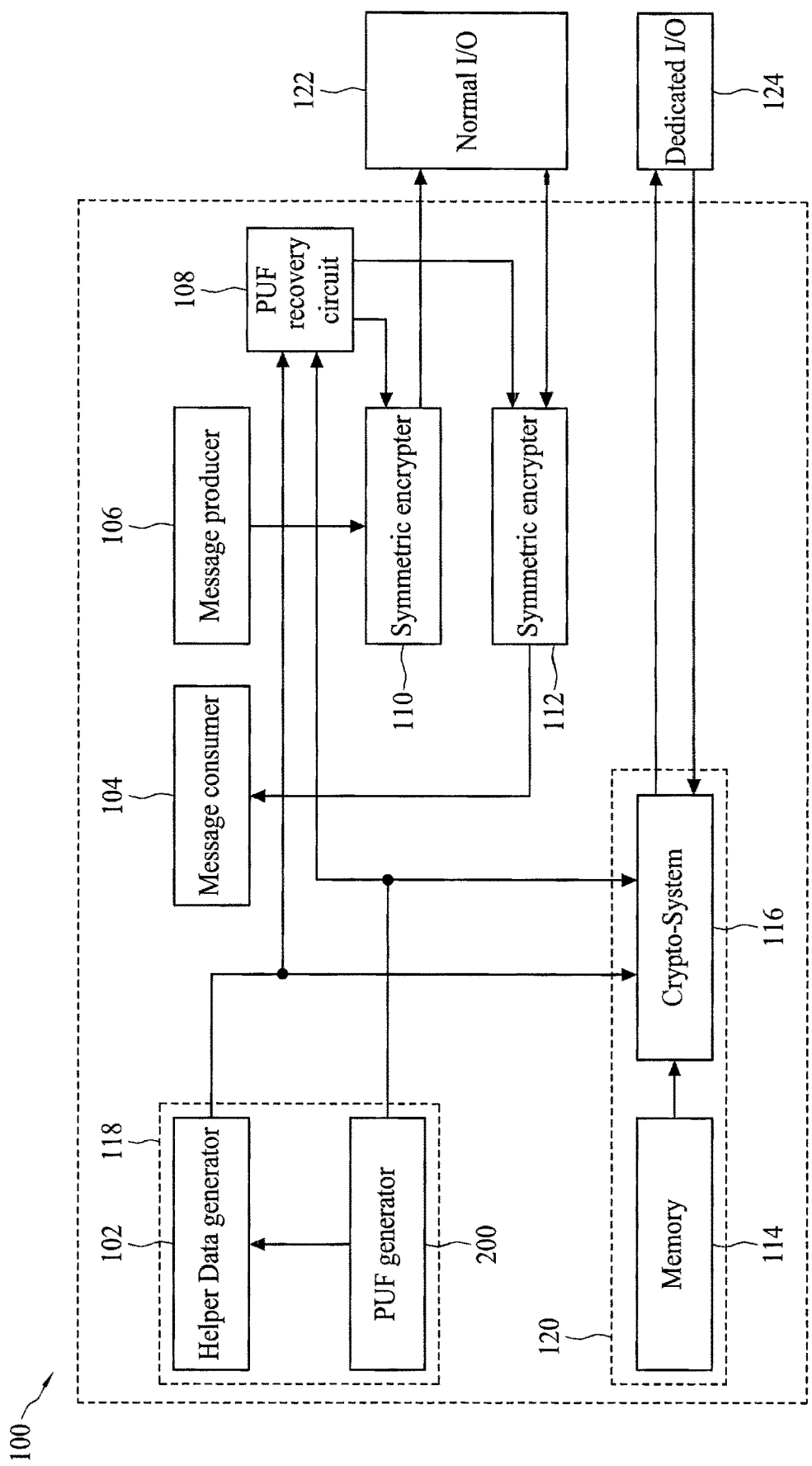
FIG. 1 illustrates an exemplary block diagram of an integrated circuit (IC) device with a PUF generator, in accordance with some embodiments of the present disclosure.

FIG. 1 illustrates an exemplary block diagram of an integrated circuit (IC) device 100 with a PUF generator, in accordance with some embodiments of the present disclosure. It is noted that the IC device (hereinafter "device") 100 is merely an example, and is not intended to limit the present disclosure. Accordingly, it is understood that additional functional blocks may be provided in or coupled to the device 100 of FIG. 1, and that some other functional blocks may only be briefly described herein.

In some embodiments, the device 100 comprises a PUF generator 200, a helper data generator 102, a message consumer 104, a message producer 106, a PUF recovery circuit 108, a first symmetric encrypter 110, a second symmetric encrypter 112, a memory unit 114, and an asymmetric encrypter 116. In some embodiments, the device 100 comprises a PUF information generator 118, which comprises the PUF generator 200 and the helper data generator 102. In some embodiments, the device 100 also comprises a PUF information encrypter 120 which comprises the memory unit 114 and the asymmetric encrypter 116. In some embodiments, as discussed in further detail below in FIG. 2, the PUF generator 200 comprises a PUF cell array, which is used to generate a PUF response. In some embodiments, a PUF cell array is a circuit that measures the inherent and random manufacturing variations presented in a device in order to generate a unique signature key in response to an input (i.e., challenge). In some embodiments, the PUF generator 200 may further comprise post- or pre-processing error correction, noise injector for quick identification of unstable bit cells, population counter, etc., which are not shown in FIG. 1.

In some embodiments, the helper data generator 102 is configured to produce helper data which can be transmitted to a server together with the PUF response. In some embodiments, the helper data generator 102 contains helper data algorithms for error correction to extract a normal PUF response from a noisy PUF response generated by the PUF cell array 202. In some embodiments, the helper data can be also used to derive a noisy PUF response from a normal PUF response. In some embodiments, the helper data generator 102 can also be a memory unit used to store pre-generated helper data.

In some embodiments, the first and second symmetric encrypters 110 and 112 are for data encryption and decryption purposes. Specifically, in some embodiments, the message consumer 104 receives decrypted text (i.e., plain text) from the second symmetric encrypter 112, wherein the second symmetric encrypter 112 decrypts cipher text received from a server and converts to plain text in a secured communication. Similarly, the message producer 106 transmits plain text to the first symmetric encrypter 110, wherein the first symmetric encrypter 110 encrypts the plain text and converts to cipher text, which are further transmitted to the server in a secured communication, according to some embodiment. In some embodiments, the first symmetric encrypter 110 and the second symmetric encrypter 112 are coupled to a normal input/output port 122 for transmitting and receiving cipher text, respectively. In some embodiments, encryption or decryption on the first and second symmetric encrypters 110 and 112 are based on the PUF response produced by the PUF generator 200. In some embodiments, the PUF recovery circuit 108 is a device in which the helper data is used to filter out noises and recover a normal PUF output from a corrupted PUF output, for example under some operation conditions or aged devices. For example, the PUF recovery circuit 108 is an error correcting code (ECC) circuit to correct corrupted bits in a PUF output. In some embodiments, the helper data can be check bits of ECC. When a data is sent from the device 100 to a server, the PUF recovery circuit 108 is used to derive the helper data which is sent together with the encrypted data using the first symmetric encrypter 110 through the normal I/O port 122 to the server. When the device 100 receive an encrypted data from the server, it uses the helper data to correct the PUF bits if necessary to derive the PUF signature for decrypting the cipher text using the second symmetric encrypter 112 from the server through the normal I/O port 122.

In some embodiments, the memory unit 114 is a non-volatile memory which can be based on a one-time programmed (OTP) technology. In some embodiments, the memory unit 114 is a read-only memory (ROM), an electronic fuse (eFuse), or any other types of OTP memories. In some embodiments, the memory unit 114 is used to store at least one built-in public key, wherein the at least one public key is generated and write to the memory unit 114 during the manufacturing of the device 100. In some embodiments, the at least one public key stored in the memory unit 114 is generated together with at least one corresponding private key. In some embodiments, when there is a plurality of public keys stored in the memory unit 114, the plurality of public keys each has an index, wherein the index of the plurality of public keys can be varied. In some embodiments, different devices 100 may have different public keys stored in their corresponding memory units 114.

In some embodiments, the asymmetric encrypter 116 in the device 100 uses one public key stored in the memory unit 114 to encrypt the PUF response and the helper data before it is synchronized with a server. Similarly, the server also comprises an asymmetric encrypter (not shown) which uses the corresponding private key to decrypt the PUF response and the helper data, which are encrypted by the public key. In some embodiments, a private key in a public-private key pair is only known to an authorized server. In some embodiments, the asymmetric encrypter 116 contains one of the following asymmetric key encryption algorithm, such as for example RSA (Rivest-Shamir-Adleman), DSA (Digital Signature Algorithm), ECC (Elliptic Curve Cryptography), ElGamal algarithms, etc. In some embodiments, the public-key-encrypted PUF information (i.e., the PUF response and the helper data) are transmitted to the server through a dedicated input/output (I/O) port 124. Therefore, this public-private key pair which is used to encrypt and decrypt the PUF information prevents unauthorized servers from obtaining the PUF information and therefore, the PUF information from a device is limited to authorized servers.

Figure 2:
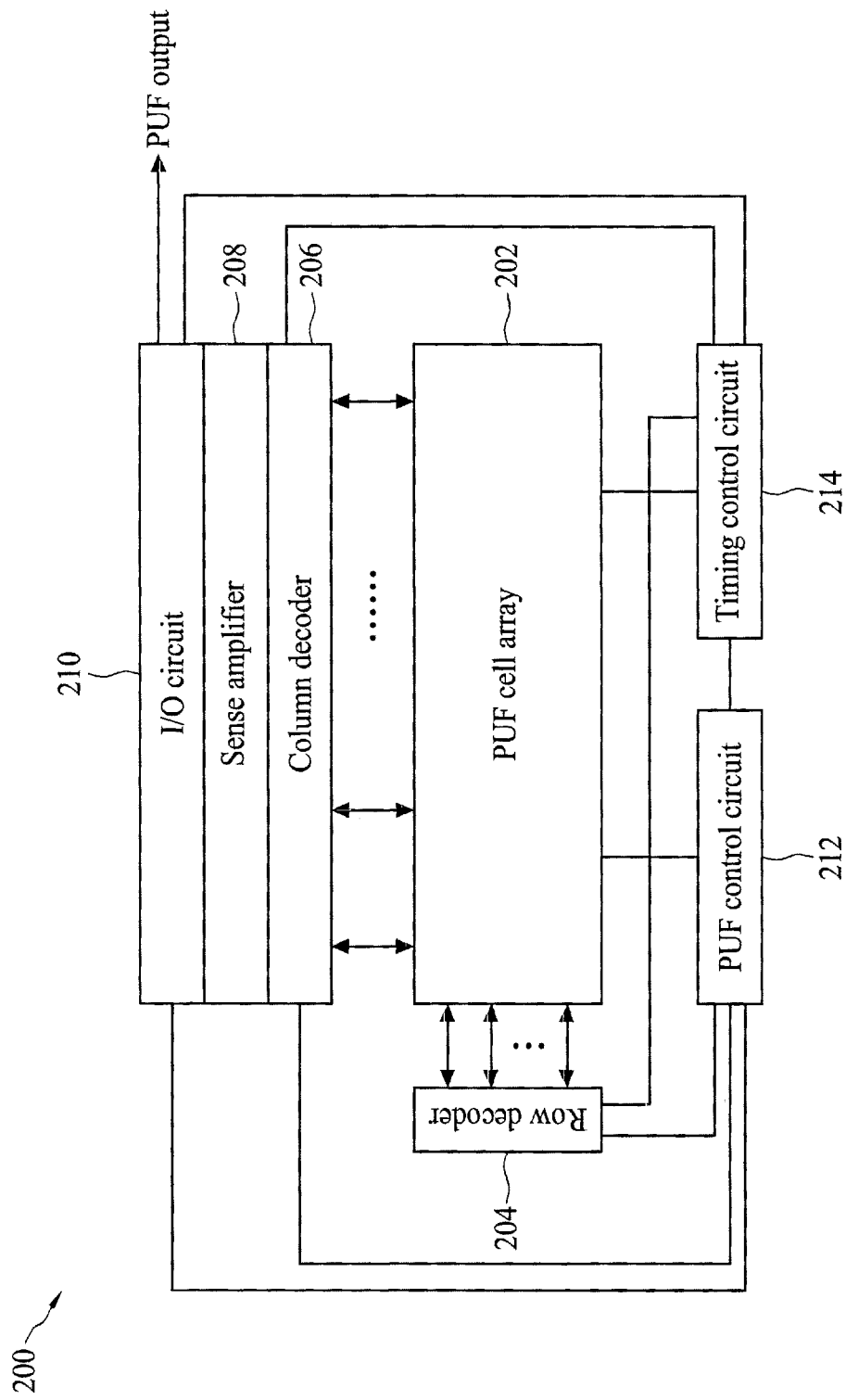
FIG. 2 illustrates an exemplary block diagram of a PUF generator, in accordance with some embodiments of present disclosure.

FIG. 2 illustrates an exemplary block diagram of a PUF generator 200, in accordance with some embodiments of present disclosure. It is noted that the PUF generator 200 is merely an example, and is not intended to limit the present disclosure. Accordingly, it is understood that additional functional blocks can be added in or coupled to the PUF generator 200 of FIG. 2, and that some other functional blocks may only be briefly described herein. In the illustrated embodiment of FIG. 2, the PUF generator 200 comprises a PUF cell array 202, a row decoder 204, and a column decoder 206, that are coupled to a plurality of bit cells in the PUF cell array 202. The PUF generator 200 further comprises a sense amplifier 208, an input/output (I/O) circuit 210, a PUF control circuit 212 and a timing control circuit 214, in the illustrated embodiment. All the components may be coupled to each other and further to the PUF control circuit 212 and the timing control circuit 214.

The PUF cell array 202 includes a plurality of bit cells that are arranged in a column-row configuration in which each column has a bit line (BL), a bit line bar (BLB), a power supply voltage line (VDD), and a reference/ground voltage line (VSS), and each row has a word line (WL). More specifically, the BL, BLB, VDD, and VSS of each column are respectively coupled to a plurality of bit cells that are disposed in that column, and each bit cell in that column is arranged on a different row and coupled to a respective (different) WL. That is, each bit cell of the PUF cell array 202 is coupled to a BL of a column of the PUF cell array 202, a BLB of the column of the PUF cell array 202, a VDD of the column of the PUF cell array 202, a VSS of the column of the PUF cell array 202, a WL of a row of the PUF cell array 202. In some embodiments, the BL's, BLB's, BLV's and ZLV's are arranged in parallel vertically and the WL's are arranged in parallel horizontally (i.e., perpendicular to the BL's and BLB's). The plurality of bit cells of the PUF cell array 202 may be implemented as any of a variety of types of memory cells such as, for example, 2T-2R (2 transistors-2 resistors) SRAM (Static Random-Access Memory) bit cell, 4T-SRAM bit cell, 8T-SRAM bit cell, 14T-SRAM, DRAM (Dynamic Random-Access Memory) bit cells, etc., according to some embodiments of present disclosure. An illustrated embodiment of the PUF cell array 202 will be provided in further detail below with reference to FIG. 3.

The row decoder 204 is configured to receive a row address of the PUF cell array 202 and enable the WL at that row address. In some embodiments, the column decoder 206 may be optional. The column decoder 206 is configured to receive a column address of the PUF cell array 202 and enable the BL and/or BLB at that column address. The sense amplifier 208 and I/O circuit 210 are configured to access a logical state (i.e., a logical "1" or a logical "0") at each of the plurality of bit cells in the PUF cell array 202. In some embodiments, the logical state of each of the plurality of bit cells in the PUF cell array may be written to or read from a bit cell by the I/O circuit 210.

In some embodiments, such I/O circuit 210 may be directly coupled to the PUF control circuit 212. The PUF control circuit 212 is configured to receive a request/challenge through the I/O circuit 110 (e.g., a request to power on the coupled PUF cell array 202, a request to access the PUF response of the PUF cell array 202, etc.). In some embodiments, the PUF control circuit 212 is configured to transmit a PUF response based on the logical states of the bit cells of the PUF cell array 202 through the I/O circuit 210. The PUF control circuit 212 is further configured to control (e.g., increase or decrease) a voltage level of a VDD and/or VSS applied at each of the bit cells, control (e.g., increase or decrease) a voltage level applied at each of the WL. In some embodiments, the PUF control circuit 212 may enable the voltage supply to at least one selected column and at least one selected row. Further, the PUF control circuit 212 may switch between a synchronization process where the device synchronizes its encrypted PUF information through the dedicated I/O port 124 and a normal operation process where the device and the server exchange encrypted messages through the normal I/O port 122, according to certain embodiments. The PUF control circuit 212 may be also used to introduce noises to expedite an identification process during which unstable bit cells which do not provide a constant logical state are identified and later filtered from the PUF response. In some embodiments, the PUF control circuit 212 may control a periodic reading of logical states of the bit cells to count the total number of bit cells that have flipped logical states. In some alternative embodiments, the PUF control circuit 212 may be implemented as a separate block, which is not embedded in the PUF cell array 202. In some embodiments, the PUF control circuit 212 can be embedded in the PUF cell array 202. In some embodiments, the timing control circuit 214 provide control and synchronization on pulse signals during read and write processes. In some embodiments, the PUF control circuit 212 and timing control circuit 214 may be coupled to a common data bus for inter-communication.

Figure 3:
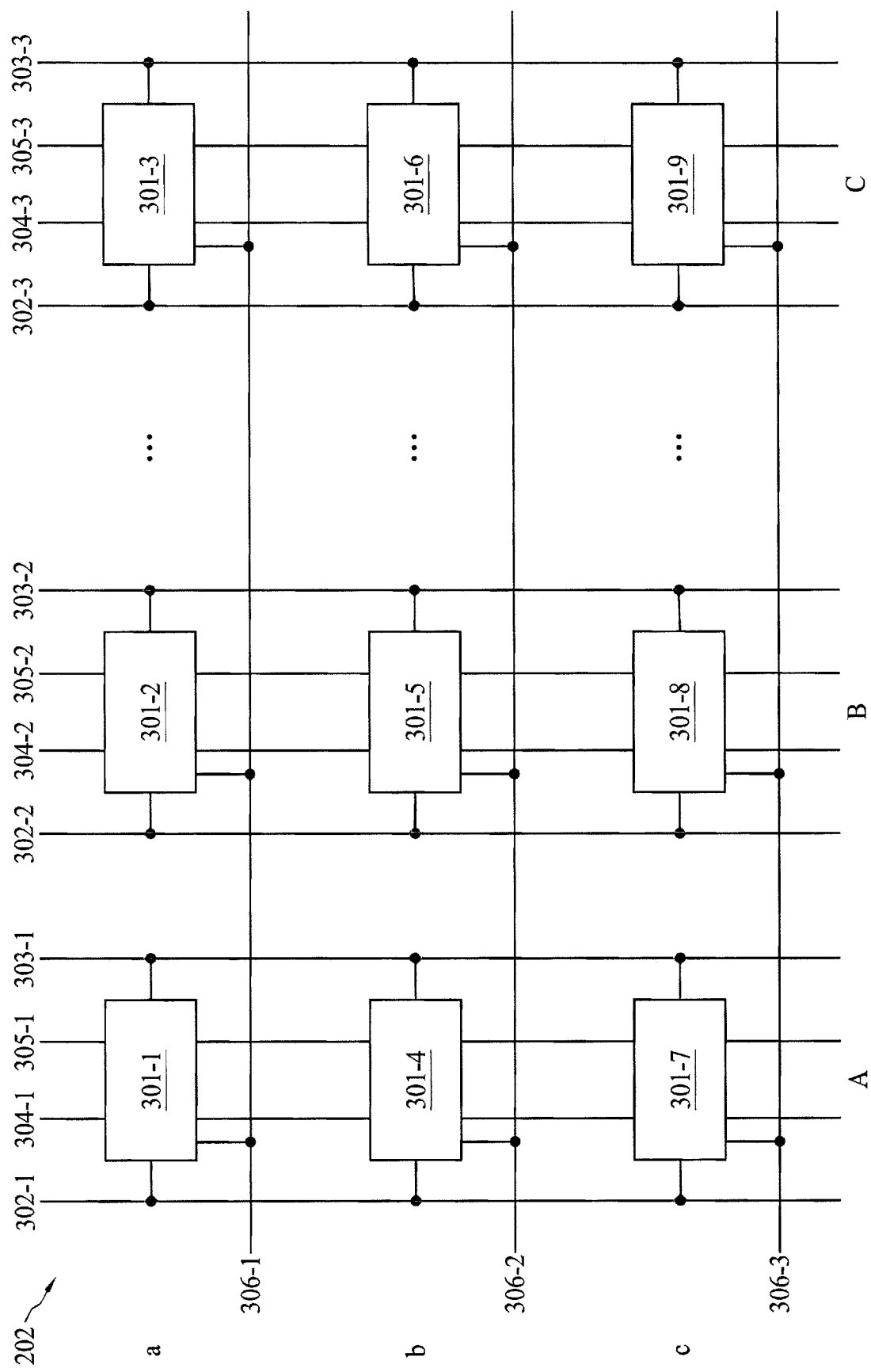
FIG. 3 illustrates an exemplary circuit diagram of a PUF cell array comprising a plurality of bit cells, in accordance with some embodiments of present disclosure.

FIG. 3 illustrates an exemplary circuit diagram of a PUF cell array 202 comprising a plurality of bit cells 301, in accordance with some embodiments of present disclosure. In some embodiments, the PUF cell array 202 includes a plurality of bit cells 301-1, 301-2, 301-3, 301-4, 301-5, 301-6, 301-7, 301-8, and up to 301-9. Although only 9 bit cells are shown, any desired number of bit cells may be included in the PUF cell array 202 while remaining within the scope of the present disclosure. As described above, the bit cells 301-1, 301-2, 301-3, 301-4, 301-5, 301-6, 301-7, 301-8, and 301-9 are arranged in a column-row configuration. More specifically, in some embodiments, the PUF cell array 202 includes bit lines (BL's) 302-1, 302-2, and 302-3 arranged in parallel, bit line bars (BLB's) 303-1, 303-2, and 303-3, arranged in parallel, and word lines (WL's) 306-1, 306-2, and 306-3. The WL's 306 are arranged in parallel orthogonally to the BL's 302 and BLB's 303. In some embodiments, the PUF cell array 202 also includes power supply voltage lines (VDD's) 304-1, 304-2, and 304-3, and zero voltage lines (VSS's) 305-1, 305-2 and 305-3. As such, the PUF cell array 202 may include a first plurality of columns (e.g., arranged vertically), a second plurality of rows (e.g., arranged horizontally), wherein each column includes a respective pair of BL 302, BLB 303, VDD 304, VSS 305, and each row includes a respective WL 306.

For example, as shown in the illustrated embodiment of FIG. 3, the PUF cell array 202 includes columns "A," "B," and "C," and rows "a," "b," and "c," wherein column A includes respective BL 302-1, BLB 303-1, VDD 304-1 and VSS 305-1; column B includes respective BL 302-2, BLB 303-2, VDD 304-2 and VSS 305-2; column C includes respective BL 302-3, BLB 303-3, VDD 304-3 and VSS 305-3; row a includes a respective WL 306-1; row b includes a respective WL 306-2; and row c includes a respective WL 306-3.

Moreover, each column includes one or more bit cells 301 that are each coupled to the column's respective BL, BLB, VDD, VSS, and a different separate WL. For example, column A includes bit cells 301-1, 301-4, and 301-7, wherein the bit cells 301-1, 301-4, and 301-7 are each coupled to the BL 302-1, BLB 302-1, VDD 304-1, VSS 305-1, WL's 306-1, 306-2, and 306-3, respectively; column B includes bit cells 301-2, 301-5, and 301-8, wherein the bit cells 301-2, 301-5, and 301-8 are each coupled to the BL 2302-2, BLB 303-2, VDD 304-2, VSS 305-2, WL's 306-1, 306-2, and 306-3, respectively; and column C includes bit cells 301-3, 301-6, and 301-9, wherein the bit cells 301-3, 301-6, and 301-9 are each coupled to the BL 302-3, BLB 303-3, VDD 304-3, VSS 305-3, WL's 306-1, 306-2, and 306-3, respectively. It should be noted the PUF cell array 202 is merely an example is not intend to be limiting. Accordingly, additional or different signal lines can be used in the PUF cell array 202 of FIG. 3 depending on the type of bit cells 301 and PUF generation technologies used in the PUF cell array 202. Furthermore, the signal lines (i.e., BL's 302, BLB's 303, VDD's 304, VSS's 305, and WL's 306 in the illustrated embodiment) can be arranged differently according to the fabrication technology and circuit layouts, which are within the scope of the present disclosure.

In some other embodiments, the PUF cell array 202 can be a SRAM (Static Random-Access Memory) PUF, a DRAM (Dynamic Random-Access Memory) PUF, a butterfly PUF, a bistable Ring PUF, a digital PUF, a magnetic PUF, a metal based PUF, a quantum confinement PUF, a VIA (via-hole) PUF, a photonic PUF, etc. In some embodiments, each bit cell 301 of the PUF cell array 202 (e.g., 301-1, 200-2, 301-3, 301-4, 200-5, 301-6, 200-7, 301-8, 301-9, etc.) may include a plurality of transistors (e.g., six MOSFET's for a 6T-SRAM bit cell, eight MOSFET's for an 8T-SRAM bit, three MOSFET's for an 3T-DRAM bit, twelve MOSFET's for an 12T-SRAM bit, 3T-DRAM, etc.). In some embodiments, a logical state stored in each bit cell may be written to the bit cell by applying either a high state (i.e., a logical "1") or a low state (i.e., a logical "0") through a corresponding BL, BLB, and WL. In some embodiments, a stable logical state of a bit cell can be achieved after stabilizing from a metastable logical state due to intrinsic differences in the bit cells 301.

Figure 4:
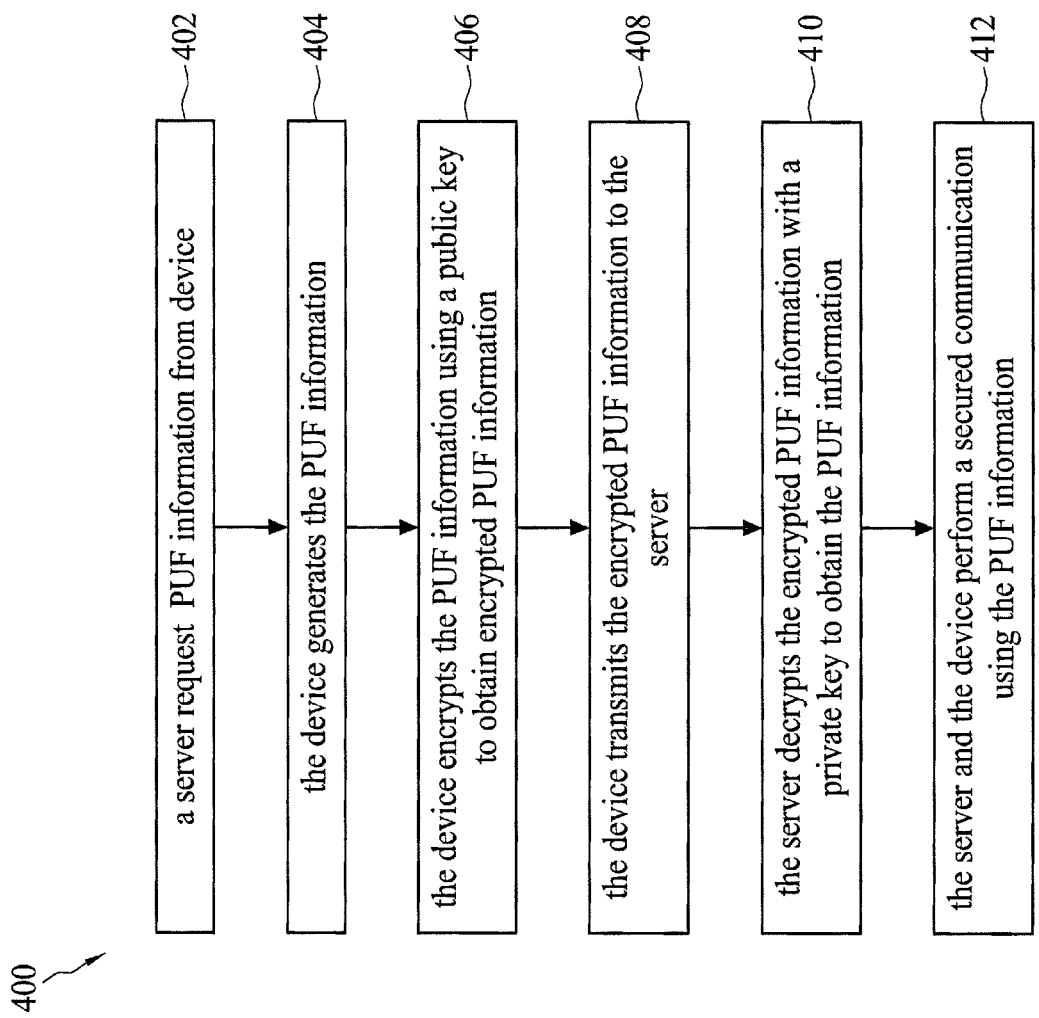
FIG. 4 illustrates a flowchart of a method to secure PUF information for secured communication between a device and a server, in accordance with some embodiments of the present disclosure.

FIG. 4 illustrates a flowchart of a method 400 to secure PUF information for secured communication between a device 100 and a server, in accordance with some embodiments of the present disclosure. It is noted that the method 400 is merely an example, and is not intended to limit the present disclosure. Accordingly, it is understood that additional operations may be provided before, during, and after the method 400 of FIG. 4, and that some other operations may only be briefly described herein.

The method 400 starts with operation 402, in which PUF information is requested by a server from a device according to some embodiments. In some embodiments, the server submits its request for the PUF information to establish a secured communication through a normal I/O port 122.

The method 400 continues with operation 404, in which PUF information is generated according to some embodiments. In some embodiments, the PUF information comprises a PUF response R1 and helper data H1, wherein the PUF response R1 is generated by a PUF generator 202, which is controlled by the PUF control circuit 212 and the timing control circuit 214 according to the type of bit cells 301 and PUF technology used in the PUF cell array 202. For example, the plurality of bit cells 301 in a PUF cell array 202 each can be a SRAM bit cell comprising cross-coupled inverters with two internal storage nodes, wherein the two internal storage nodes are configured initially with substantially the same voltage levels. Once the cross-coupled inverters are enabled, voltage levels and thus logical states on the two storage nodes of each of the plurality of bit cells 301 are stabilized and used as a unique PUF response. For another example, the plurality of bit cells 301 of the PUF cell array 202 each comprises a DRAM bit cell with at least one storage node which is pre-charged with a voltage level. The charge stored on the at least one storage node changes due to leakage currents in the associated transistors causing a flip of its logical states. Total time that takes for each of the bit cells 301 to flip its logical state varies and the logical states of the plurality of bit cells 301 in the PUF cell array 200 at a certain time can then be used as the unique PUF response. These are merely examples and are not intended to be limit the present disclosure. It should be noted that various types of bit cells based on various types of technologies can be used and are within the scope of this invention.

The PUF information, including the PUF response R1 and the helper data H1 generated from the PUF generator 200 and the helper data generator 102 respectively, is then transmitted through an I/O circuit 210 to a PUF recovery circuit 108 (e.g., an ECC circuit), where a normal PUF output is recovered from a corrupted PUF output, and further to a crypto-system 116 for encryption. In some embodiments, the crypto-system is an asymmetric encrypter.

The method 400 continues to operation 406 in which the PUF information is encrypted using a public key. In some embodiments, this encryption is performed by an asymmetric encrypter 116 using the public key Pk pre-generated and stored in the memory unit 114 of the device 100. In some embodiments, the asymmetric encrypter 116 comprises a processor and a control logical circuit (both are not shown in FIG. 1) in order to encrypt the PUF information to be transmitted to the server in response to a request received from the server at the asymmetric encrypter 116 through a dedicated I/O port 124. In some embodiments, the asymmetric encrypter 116 is configured to receive the public key Pk stored in the memory unit 114 for PUF information encryption. In some embodiments, the processor of the asymmetric encrypter 116 can select one public key Pk from a plurality of public keys stored in the memory unit 114 to encrypt the PUF information. This mechanism using multiple public keys provides additional security to the PUF information since an unauthorized server is not able to determine which public key is used to encrypt the PUF information. In some embodiments, different devices 100 with different chip identifications (IDs) can have different public keys. The chip ID can be used to identify and verify whether the device 100 is an authorized device for secured communication. In some embodiments, a bit-serial version of the encryption engine can be used in the asymmetric encrypter 116 to reduce the overhead. In some embodiments, encryption of the PUF information involves taking the modulus of an exponential function. It should be noted that this is just an example, any types of encryption algorithm in the asymmetric encrypter 116 to generate encrypted PUF information E(Pk, R1||H1) for the server from which a request is received, can be used and are within the scope of this invention.

The method 400 continues to operation 408 in which the encrypted PUF information E(Pk, R1||H1) using the public key is transmitted to the server for decryption of the PUF information, according to some embodiments. In some embodiments, the encrypted PUF information E(Pk, R1||H1) is transmitted to the server through the dedicated I/O port 124 coupled to the asymmetric encrypter 116, which is used for receiving the request from the server and for transmitting the encrypted PUF information E(Pk, R1||H1) to the server.

The method 400 continues to operation 410 in which the encrypted PUF information E(Pk, R1||H1) is decrypted by the server using a private key to obtain the PUF information, according to some embodiments. In some embodiments, the private key (Sk) is generated together with the public key (Pk) and distributed to an authorized server. In some embodiments, the server also comprises a second crypto-system. In some embodiments, the second crypto-system can be an asymmetric encrypter which contains one of the following asymmetric key encryption algorithm, such as for example RSA (Rivest-Shamir-Adleman), DSA (Digital Signature Algorithm), ECC (Elliptic Curve Cryptography), ElGamal algorithms, etc. In some embodiments, if a private key Sk is able to decrypt the encrypted PUF information E(Pk, R1||H1), the PUF information including the PUF signature R1 and the helper data H1 can be determined. In some other embodiments, if an unauthorized server uses a private key Sk that does not pair with the public key Pk to decrypt the encrypted PUF information E(Pk, R1||H1), the PUF information including the PUF signature R1 and the helper data H1 cannot be obtained. This method in the present disclosure prevents any unauthorized servers from obtaining the PUF information from the device 100, which is used later in a secured communication.

The method 400 continues to operation 412 in which a secure communication is established if the server successfully decrypts the encrypted PUF information to obtain the PUF information, according to some embodiments. In some embodiments, the secured communication is performed through a normal I/O port 122 as shown in FIG. 1. In some embodiments, the server encrypts a message M using the PUF response R1 to generate cipher text E(R1, M). The server further transmits the cipher text E(R1, M) with associated helper data R1, E(R1,M)||H1 to the device 100. The device 100 generates a noisy PUF response R1* and using the helper data H1 in the received cipher text with associated helper data E(R1,M)||H1 to remove noises in R1* to obtain R1. Further, the device 100 applies R1 to decrypt E(R1,M) in order to obtain the message M received from the server.

Similarly, in some other embodiments, under a secure communication, the device 100 generates a noisy response R1* and noisy helper data H1*. The device 100 encrypts a message M to be transmitted to the server using R1* to obtain cipher text E(R1*, M). The device 100 further transmits the cipher text with associated helper data, i.e., E(R1*, M)||H1* to the server. The server uses the helper data H1* to derive the noisy response R1* according to the normal response R1 and further uses the noisy response R1* to decrypt the E(R1*,M) in order to determine the message M received from the device 100.

In an embodiment, a device for securing physically unclonable function (PUF) information includes: a PUF information generator, comprising a PUF cell array and a helper data generator, configured to generate the PUF information, wherein the PUF information comprises a PUF response and helper data; and a PUF information encrypter, comprising a memory unit and a first crypto-system, configured to store at least one public key and encrypt the PUF information from the PUF information generator using one of the at least one public key.

In another embodiment, a method for securing PUF information, includes: generating PUF information using a PUF information generator, wherein the PUF information comprises a PUF response and helper data; and determine encrypted PUF information using a PUF information encrypter, wherein the encrypted PUF information is determined by encrypting the PUF information received from the PUF information generator using one of at least one public key.

Yet in another embodiment, a device for securing PUF information, includes: a PUF cell array configured to generate a PUF response; a helper data generator configured to provide helper data; a memory unit configured to store at least one public key; a first crypto-system configured to encrypt the PUF response and helper data with one of the at least one public key; a message consumer, configured to read at least one first message from a server; a message generator, configured to generate at least one second message to the server; and at least one symmetric encrypter, configured to decrypt the at least one first message or encrypt the at least one second message.

The foregoing outlines features of several embodiments so that those ordinary skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Although the disclosure has been described in terms of exemplary embodiments, it is not limited thereto. Rather, the appended claims should be construed broadly, to include other variants and embodiments of the disclosure, which may be made by those of ordinary skill in the art without departing from the scope and range of equivalents of the disclosure.

What is claimed is:

1. A device for securing physically unclonable function (PUF) information comprising:
   a PUF information generator, comprising a PUF cell array and a helper data generator, configured to generate PUF information, wherein the PUF information comprises a PUF response and helper data; and
   a PUF information encrypter, comprising a memory unit and a first crypto-system, configured to store a plurality of public keys and encrypt the PUF information from the PUF information generator using one of the plurality of public keys, wherein the plurality of public keys is stored in the memory unit,
   wherein the first crypto-system comprises an asymmetric encrypter configured to select one of the plurality of public keys to produce encrypted PUF information.

2. The device of claim 1, wherein the PUF cell array comprises a plurality of bit cells, wherein the plurality of bit cells is configured to produce a PUF response according to corresponding logical states of the plurality of bit cells.

3. The device of claim 1, wherein the helper data is further configured to remove noises in the PUF response.

4. The device of claim 1, wherein the memory unit is a non-volatile memory device.

5. The device of claim 1, wherein the encrypted PUF information is further transmitted to a server, wherein a second crypto-system of the server is used to decrypt the encrypted PUF information to obtain the PUF information.

6. The device of claim 1, further comprising
   a message consumer, configured to read a first message from the server;
   a message generator, configured to generate a second message for the server; and
   at least one symmetric encrypter, configured to decrypt the first message or encrypt the second message using the PUF information.

7. A method for securing physically unclonable function (PUF) information for an integrated circuit (IC) device, comprising:
   storing a plurality of public keys in a memory of the IC device;
   generating PUF information using a PUF information generator, wherein the PUF information comprises a PUF response and helper data;
   selecting one of plurality of public keys for encrypting the PUF information;
   encrypting the PUF information received from the PUF information generator using the selected one of the plurality of public keys;
   transmitting the encrypted PUF information to a server, and
   determining the PUF information by decrypting the encrypted PUF information using a second crypto-system of the server.

8. The method of claim 7, wherein the PUF response is generated using a PUF cell array, wherein the PUF cell array comprises a plurality of bit cells, configured to produce the PUF response according to corresponding logical states of the plurality of bit cells.

9. The method of claim 7, wherein the helper data is generated by a helper data generator, wherein the helper data is configured to remove noises in the PUF response.

10. The method of claim 7, wherein the encrypted PUF information is determined by a first crypto-system.

11. The method of claim 10, wherein each of plurality of public keys is associated with a corresponding index stored in the memory unit.

12. The method of claim 7 further comprising
    transmitting first cypher text to the server; and
    receiving second cypher text from the server, wherein the first cypher text are encrypted and the second cypher text are decrypted by at least one symmetric encrypter using the PUF information.

13. A device for securing PUF information comprising:
    a PUF cell array configured to generate a PUF response;
    a helper data generator configured to provide helper data;
    a memory unit configured to store a plurality of public keys;

a first crypto-system configured to select one of the plurality of public keys and encrypt the PUF response and helper data with the selected public key;

a message consumer, configured to read at least one first message from a server;

a message generator, configured to generate at least one second message to the server; and at least one symmetric encrypter, configured to decrypt the at least one first message or encrypt the at least one second message, wherein the first crypto-system comprises an asymmetric encrypter configured to select one of the plurality of public keys stored in the memory unit to encrypt the PUF response and the helper data using the selected public key.

14. The device of claim 13, wherein the PUF cell array comprises a plurality of bit cells, configured to produce the PUF response according to corresponding logical states of the plurality of bit cells.

15. The device of claim 13, wherein the helper data is configured to remove noise in the PUF response.

16. The device of claim 13, wherein the memory unit is a non-volatile memory device.

17. The device of claim 13, wherein the encrypted PUF information is further transmitted to the server, wherein a second crypto-system of the server is used to decrypt the encrypted PUF response and the encrypted helper data to obtain the PUF response and the helper data using a private key for secured communication.

* * * * *